Oct. 7, 1969   R. B. FRIDLEY   3,470,737
FIRMNESS TESTER FOR FRUIT
Filed June 9, 1966   3 Sheets-Sheet 1
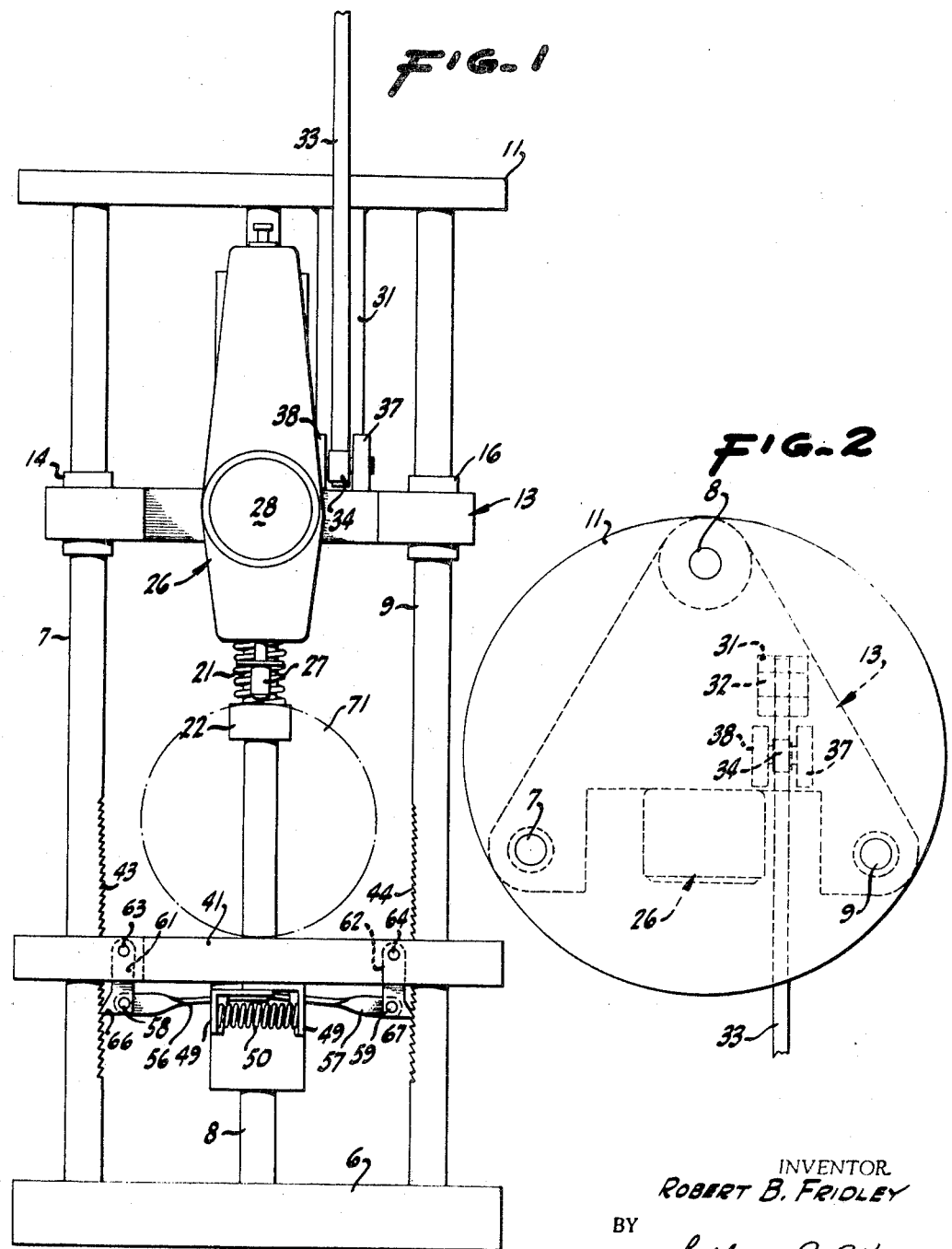
INVENTOR.
ROBERT B. FRIDLEY
BY
Lothrop & West
ATTORNEYS

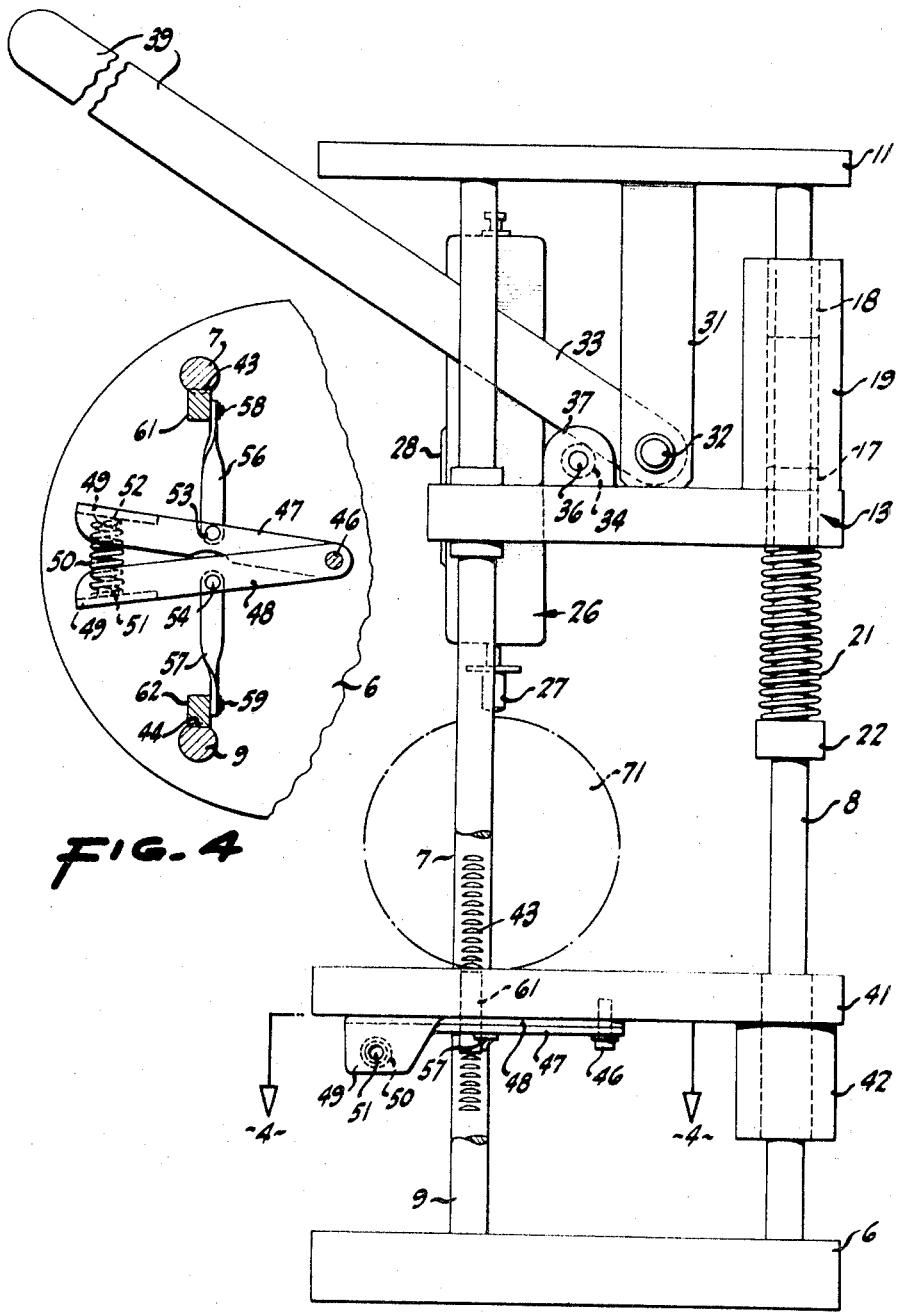

Oct. 7, 1969 R. B. FRIDLEY 3,470,737
FIRMNESS TESTER FOR FRUIT

Filed June 9, 1966 3 Sheets-Sheet 3

INVENTOR.
ROBERT B. FRIDLEY
BY
Lothrop & West
ATTORNEYS

United States Patent Office 3,470,737
Patented Oct. 7, 1969

3,470,737
FIRMNESS TESTER FOR FRUIT
Robert B. Fridley, Davis, Calif., assignor to The Regents of the University of California, Berkeley, Calif.
Filed June 9, 1966, Ser. No. 556,354
Int. Cl. G01n 3/48
U.S. Cl. 73—81                 4 Claims

ABSTRACT OF THE DISCLOSURE

A firmness tester for fruit has a fruit support near the bottom of an upright frame carrying a force measuring gauge above the fruit support and for movement downwardly toward the support. A plunger extending downwardly from the gauge is pressed against a fruit on the support when a high ratio lever on the frame is manually actuated to move the gauge downwardly toward the plunger.

---

My invention relates to means useful in testing a fruit specimen primarily to determine whether the lot, of which it is a representative example, is of sufficient maturity for picking and for other related purposes.

There are available various devices for testing the firmness of fruit in order to get an idea of the ripeness of the fruit or its suitability for harvesting, and many of these are utilized in the field. They are usually not sufficiently accurate for work such as may be done by laboratory or technical investigators, by farm advisers and the like, who require results of considerable consistency and precision. While some testers give suitably precise indications, they are too elaborate and too expensive to permit of use in the field.

Many of the fruit testers available at the present time depend for their accuracy not only on the particular fruit being tested, but also on the skill of the operator. Some operators are able to operate carefully and smoothly and consistently, whereas others are wont to use excessive force or speed in the operation of the tester and so get variable results. Another variable is that the firmness of a fruit is affected by a time factor. That is to say, the firmness characteristics of the fruit may change under the pressure of a testing plunger so that it is of considerable importance to have all operators operate the plunger at substantially the same rate at all times.

A further difficulty is that the tester and fruit may not be related to each other with sufficient accuracy. The pressure exerted is not always normal to the surface of the fruit, or the fruit may move during testing so that the results are not consistent.

It is therefore an object of my invention to provide a firmness tester for fruit which is of considerable accuracy and can be utilized both in the laboratory and in the field.

Another object of the invention is to provide a firmness tester for fruit which is so designed as to operate substantially at the same speed at all times and with all operators.

Another object of the invention is to provide a firmness tester which will engage the fruit so that the fruit is held stationary during testing with little effort.

Another object of the invention is to afford smooth operation of the tester so that variations in firmness do not materially affect the operation.

A still further object of the invention is in general to provide an improved firmness tester for fruit.

Other objects together with the foregoing are attained in the embodiments of the invention described in the accompanying description and illustrated in the accompanying drawings, in which:

FIGURE 1 is a front elevation of one form of firmness tester for fruit pursuant to the invention;

FIGURE 2 is a plan of the structure shown in FIGURE 1;

FIGURE 3 is a side elevation of the firmness tester shown in FIGURE 1;

FIGURE 4 is a cross section, the plane of which is indicated by the line 4—4 of FIGURE 3;

Figure 5:
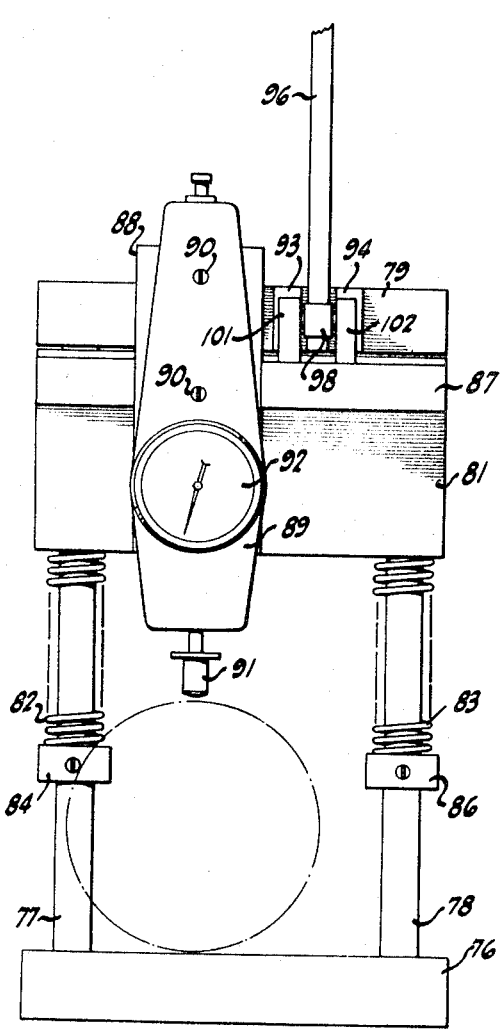
FIGURE 5 is a front elevation of a modified form of fruit tester pursuant to the invention.

In one preferred form which has met with practical success, the firmness tester is provided with a generally rectangular base 6 designed to rest on a table or other comparable support. Upstanding from the base are three columns 7, 8 and 9 arranged parallel to each other and at their upper ends connected by a top plate 11 so that an upright frame is provided. Designed to slide on the various columns is a platform 13. This is a plate generally of triangular form having a pair of bushings 14 and 16 engaging the columns 7 and 9. The platform 13, in addition to the bushings 14 and 16, is provided with bushings 17 and 18 disposed near the ends of a sleeve 19 part of and upstanding from the platform.

In order to urge the carriage uwardly away from the base 6, a helical spring 21 is provided. At one end this rests on a collar 22 adjustably fastened on the column 8 and at the other end the spring bears against the nether side of the platform 13. This mechanism accurately locates the platform for sliding movement along the various columns and the spring exerts an adjustable upward force on the platform.

Mounted on the platform 13 adjacent the forward end thereof is a force measuring gauge 26. This may be a proprietary item available on the open market. It includes a casing from which a plunger 27 projects. A dial 28 on the casing indicates the motion of plunger 27 against the expelling force of a spring (not shown). The gauge 26 is fastened to the platform 13 so that the plunger 27 is disposed substantially between and parallel to the columns 7 and 9 at an appropriate distance away from the base 6.

In order simultaneously to move the platform 13 and the body of the gauge 26, I provide a special means. This includes a fulcrum block 31 depending from the top plate 11 and bifurcated near its lower end to receive a pivot pin 32 having its axis crosswise of the machine. Fulcrumed on the cross pin 32 is a relatively long, manually operable lever 33. The lever bears upon a roller 34 journalled on a cross pin 36 secured in bosses 37 and 38 upstanding from the carriage 13. The handle is extended to provide a grip portion 39 at a considerable distance from the fulcrum 32. In fact, it has been found convenient to make the distance between the fulcrum 32 and the handle portion about sixteen times as great as the distance between the fulcrum 32 and the roller 34.

When the user grasps the handle 33 and manually depresses the outermost end of the lever 33, he has a large mechanical advantage in moving the carriage 13 against the urgency of the spring 21 and in lowering the gauge 26 bodily. The amount of movement which can be accomplished easily in a given unit of time produces a similar but much smaller movement of the carriage 13 in that same time. Because of the large amount of leverage, the control of the carriage is quite precise and cannot vary a great deal in time since the ability of a user to move the lever downwardly from its uppermost position is not great. Variations in resistance are not material since the operator can easily overcome all of them.

Since fruit of various sizes is available for testing in this device, I provide means for submitting the fruit almost directly to the plunger 27. Designed to slide on the columns 7, 8 and 9 very much as the carriage 13 slides is a table 41 of plate-like configuration having an extended boss 42 closely engaging around the lower portion of the column 8. The table is movable toward and away from the base 6.

Means are provided for holding the table 41 in any selected location. For that reason, the columns 7 and 9 in their portions within the normal table travel are provided with a series of indentations 43 and 44 to define ratchet teeth. Mounted to swing on a vertical pivot pin 46 extending beneath and set in the table are levers 47 and 48 having depending finger pads 49 urged apart by a coil spring 50 spanning the space between the levers and held against dislodgement by protuberances 51 and 52 formed in the finger pads 49. Connected to the levers 47 and 48 by pins 53 and 54 are twisted links 56 and 57. These in turn are connected by pins 58 and 59 to pawls 61 and 62 designed to swing on pins 63 and 64 mounted in cut-out portions of the table 41. The pawls 61 and 62 have sharpened points 66 and 67 designed to interengage between the ratchet teeth 43 and 44 in any one of various selected locations.

The user by pinching the finger pads 49 of the levers 47 and 48 against the urgency of the spring 50 rocks the pawls 61 and 62 toward each other, thus disengaging their points 66 and 67 from the adjacent columns 7 and 9. The table can then be manually lifted or lowered to any selected location, whereupon the levers 47 and 48 are released and the spring 50 again causes the pawl points 66 and 67 to engage between the adjacent ratchet teeth. The table is thus locked at the selected height. While the table can be lifted at any time without bothering to disengage the levers 47 and 48, it cannot be lowered without operating the levers 47 and 48.

In the use of this device, the table is set at an appropriate height to accommodate a fruit 71 to be tested for firmness. The fruit as nearly as possible is placed with one of its approximate diameters immediately continuing the axis of the plunger 27 and with a normal portion of the fruit surface parallel to the plunger bottom surface. It is important to have the fruit close to the bottom of the plunger and to support the fruit firmly in position on the table 41. When the fruit has been so positioned and is being held, the user grasps the outer end 39 of the lever 33 and moves it downwardly. This motion by almost any user is naturally accomplished only at a fairly consistent, reasonable rate. The downward motion of the plunger 27 is approximately only one-sixteenth as far and at one-sixteenth the rate. In actual practice, a wide variety of users by natural inclination all approximate a steady, fairly standardized rate of approach of the plunger to the fruit.

When the plunger encounters the surface of the fruit, the increasing resistance of the fruit, although felt by the user, does not greatly change the rate of approach since the extra force required is reduced so much by the leverage. Variations in encountered resistance, therefore, do not change the speed of operation of the lever in any significant amount. After the plunger 27 is in abutment with the fruit, the gauge 28 indicates the value of the pressure being exerted. The lever 33 may be continued in its downward direction until after the plunger 27 pierces the outside of the fruit and so gives an indication of the firmness of the fruit. From data acquired in this fashion, the investigator, grower or buyer can determine how near to maturity the fruit may be.

When the test is over, the user releases the lever. The spring 21 restores the platform 13 to an upper position approximating that shown in FIGURE 1. It is easy to remove the tested fruit 71, discard it and replace it with another fruit to be tested. If these fruits are substantially the same size, no intermediate adjustment of the table 41 must be made. However, if the fruit varies substantially in size from one test to another, then the table 41 is correspondingly moved so that in each instance the upper exposed portion of the fruit is closely beneath the lower end of the plunger 27 so that a movement of the lever 33 within the permissible range will afford an accurate indication of the firmness of the fruit.

Figure 6:
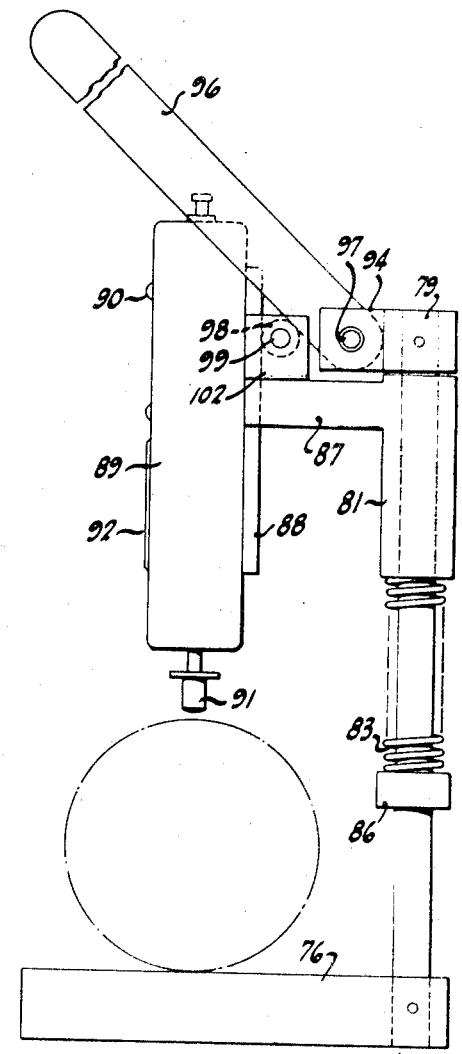
FIGURE 6 is a side elevation of the form of device illustrated in FIGURE 5.

In some instances a tester of even simpler form serves many purposes equally well. As shown in FIGURES 5 and 6, this form of firmness tester includes a base 76 from the rear of which a pair of columns 77 and 78 extend upwardly to a cross bridge 79 pinned in place. Slidable on the columns is a carriage 81 pushed upwardly by a pair of helical springs 82 and 83. Each of the springs rests on its own adjustable collar 84 or 86 so that the spring tension can be set at the desired value. The carriage 81 has a forward extension 87 with a pad 88 depending therefrom and to which a gauge 89 is fastened by screws 90. A number of holes (not shown) in the pad 88 provide for limited vertical position change of the gauge 89 relative to the pad 88. The gauge may be the same as shown in the preceding figures and includes a depending plunger 91 and a dial indicator 92.

In order that the carriage 81 can be actuated, the bridge 79 carries a pair of forwardly projecting ears 93 and 94 in which a lever 96 of considerable length is fulcrumed by means of a pivot pin 97. The lever bears against a roller 98 on a cross pin 99 mounted in ears 101 and 102 upstanding from the carriage 81.

In the operation of this structure, the procedure is as before except that there is no movable table 41 to support the fruit. The fruit is supported directly upon the base 76. This is readily accomplished when the fruit being tested is of a nearly uniform size. Following the positioning and holding of the fruit, the long lever 96 is operated by the user and this produces a nearly constant rate of actuation of the carriage 81. The carriage is forced downwardly until the plunger 91 encounters and pierces the tested fruit. The indications of the dial 92 afford the numerical results.

What is claimed is:

1. A firmness tester for fruit comprising a base on which a fruit can be rested, a frame upstanding from said base, a platform, means for mounting said platform on said frame above said base for sliding movement toward and away from said base, means for urging said platform upwardly away from said base, a force measuring gauge having a movable plunger projecting therefrom, means for mounting said gauge on said platform with said plunger extending downwardly toward said base from a position above said fruit, a hand lever, pivot means pivoting one end of said hand lever to said frame and roller means on said platform adjacent said pivot means and engageable by said lever to produce a relatively small movement of said platform downwardly relative to said base for a relatively large movement of the other end of said lever relative to said base.

2. A firmness tester for fruit as in claim 1 in which said lever provides a motion ratio of the order of sixteen to one between the motion of the lever end and the motion of said platform.

3. A firmness tester as in claim 1 in which said plunger depends below and is solely supported by said gauge.

4. A firmness tester for fruit comprising a base on which a fruit can be rested, a frame upstanding from said base, a platform, means for mounting said platform on said frame above said base for sliding movement toward and away from said base, means for urging said platform upwardly away from said base, a force measuring gauge having a movable plunger projecting therefrom, means for mounting said gauge on said platform with said plunger extending downwardly toward said base from a position above said fruit, a hand lever, and means interrelating said hand lever with said frame and said platform to produce a relatively small movement of said platform downwardly relative to said base for a relatively large movement of said lever relative to said base, said frame including at least one column and said platform including at least one sleeve encompassing said column, said urging means being a compression spring surrounding said column and abutting said base and said platform.

References Cited

UNITED STATES PATENTS

| 2,227,216 | 12/1949 | Christel | 73—81 |
| 2,520,387 | 8/1950 | Dobry et al. | 73—81 |
| 2,804,769 | 9/1957 | Clark | 73—8 |
| 2,849,876 | 9/1958 | Blosjo | 73—8 |
| 3,041,837 | 7/1962 | Godshall | 73—9 |

CHARLES A. RUEHL, Primary Examiner

U.S. Cl. X.R.

73—94